(12) United States Patent
Hursey

(10) Patent No.: US 7,376,842 B1
(45) Date of Patent: May 20, 2008

(54) MALWARE SCANNING MESSAGES CONTAINING MULTIPLE DATA RECORDS

(75) Inventor: Neil John Hursey, Hertford Heath (GB)

(73) Assignee: McAfee, Inc., Santa Clara, CA (US)

( * ) Notice: Subject to any disclaimer, the term of this patent is extended or adjusted under 35 U.S.C. 154(b) by 1044 days.

(21) Appl. No.: 10/096,430

(22) Filed: Mar. 13, 2002

(51) Int. Cl.
*H04K 1/00* (2006.01)
*G06F 11/30* (2006.01)
*G06F 7/04* (2006.01)
*G06F 17/30* (2006.01)

(52) U.S. Cl. ............... 713/188; 713/187; 713/189; 726/27; 726/28; 726/29; 726/30; 709/224; 709/246

(58) Field of Classification Search ........... 713/188
See application file for complete search history.

(56) References Cited

U.S. PATENT DOCUMENTS

| | | | |
|---|---|---|---|
| 5,319,776 A * | 6/1994 | Hile et al. ............ | 726/24 |
| 6,029,256 A * | 2/2000 | Kouznetsov ............ | 714/38 |
| 6,842,861 B1 * | 1/2005 | Cox et al. ............ | 713/188 |
| 2002/0103783 A1 * | 8/2002 | Muhlestein ............ | 707/1 |

OTHER PUBLICATIONS

"Direct Internet Message Encapsulation" (Henrik F. Nielsen, May 23, 2001).*
"Direct Internet Message Encapsulation" (Henrik F. Nielsen, Feb. 1, 2002).*
Powell, "DIME: Sending Binary Data with your SOAP Messages," Microsoft Corporation, Jan. 22, 2002.

* cited by examiner

*Primary Examiner*—Ayaz Sheikh
*Assistant Examiner*—Longbit Chai
(74) *Attorney, Agent, or Firm*—Zilka-Kotab, PC; Christopher J. Hamaty

(57) ABSTRACT

A malware scanner for DIME messages reads the file type associated with each data record within the DIME message to determine whether or not the payload data of that data record requires scanning. The length data within the header of each data record is used to move between data records within a DIME message as required during the malware scanning process.

30 Claims, 5 Drawing Sheets

MALWARE SCANNING MESSAGES CONTAINING MULTIPLE DATA RECORDS

BACKGROUND OF THE INVENTION

1. Field of the Invention

This invention relates to the field of data processing systems. More particularly, this invention relates to malware scanning received messages.

2. Description of the Prior Art

It is known to provide malware scanners that scan received messages for malware such as computer viruses, worms, Trojans, banned files, banned words, banned images and the like. An example of such a malware scanner is one in which a MIME message received by an e-mail system is scanned to see if it contains malware of any of the above mentioned types. The MIME message protocol is widely used to transfer e-mail messages. It is common for e-mail messages to contain one or more attached files. These attached files often constitute the malware against which it is designed to protect the system. The MIME message format divides the total message into different portions respectively containing an encoded version of the attachment and separated by predetermined tags. When malware scanning such a MIME message the entire MIME message must be processed to identify the tags which separate different portions of the message and then those separate portions decoded and malware scanned as required. Whilst the MIME message format is highly adaptable and flexible, this format presents a difficulty to malware scanners in that a disadvantageously large processing requirement is imposed by the need to traverse the entire MIME message to identify all its portions and then decode those portions prior to scanning.

Another disadvantage of MIME messaging is that the payload data is encoded. Thus, a computer file being transferred within a MIME message is encoded into a new form which is included within the message and requires decoding by the receiver in order to recover the original computer file. This is inefficient in terms of the increased computer processing required. Furthermore, certain computer files may be in a form that is highly compressed and the encoding may make them disadvantageously larger. Furthermore, digital signature and other security measures may be disrupted by the encoding and decoding imposed by the MIME message format.

In order to address the above problems of the MIME message format that arose through encoding and decoding of computer files, a new message format has been proposed. This is the DIME format. In this message format computer files are embedded within the message in their native binary form without encoding. As the binary sequence within the embedded data is no longer controlled by the message format, the use of tags to separate different portions of the message can no longer be reliably used since a computer file may as a matter of chance contain a particular sequence of bytes that corresponds to a tag and would be inappropriately interpreted as a division between different portions of a message. Instead, the DIME format breaks the message down into a plurality of data records each having a header including data indicating the length of that data record such that the message can be read and broken down into its respective data records at the receiver.

SUMMARY OF THE INVENTION

Viewed from one aspect the present invention provides a computer program product for detecting malware, said computer program product comprising:

receiving code operable to receive a message containing a plurality of data records, each data record having associated record characterising data and payload data, said record characterising data including type data identifying data type of payload data of said data record and length data identifying length of said data record;

determining code operable to determine from type data of a data record whether or not payload data of said data record should be scanned for malware;

scanning code operable if said type data indicates that said payload data should be scanned for malware to scan said payload data for malware; and calculating code operable if a last data record within said message has not yet been subject to said determination to calculate from said length data a start location of a next data record within said message to be subject to said determination.

The invention recognises that the structure and format of messages, such as, for example, DIME messages, may be used to increase the efficiency of malware scanning. More particularly, since a message containing multiple data records includes within each data record an indication of the data type of that data record and the length of that data record, then a determination ma be made from the data type as to whether or not that particular data record should be scanned, and optionally the manner in which it should be scanned, and then the start of the next data record identified from the length data without necessarily having to process/traverse all of the preceding data records. This enables significantly more efficient malware scanning to be performed upon a received message.

Whilst it will be appreciated that the payload data could take a wide variety of different forms and may possibly be encoded, in preferred embodiments of the invention the payload data is unencoded. The use of unencoded payload data is one of the motivations behind the adoption of this message format and has the additional advantage that malware scanning can be applied to the payload data directly without an intervening decoding or other pre-processing of the payload data being required.

It will be appreciated that whilst some of the above has discussed the DIME data format, the present techniques are not limited to this specific format although they are particularly well suited to use with the DIME message format.

It will be appreciated that the malware scanning could take a wide variety of different forms. Malware may include computer viruses, worms, Trojans, banned files, banned words, banned images and the like.

If the malware scanning detects malware within payload data, then preferred embodiments act to trigger a malware found action.

Preferred forms of malware found action include deleting at least the payload data, quarantining at least the payload data, disinfecting at least the payload data, repairing at least the payload data and issuing an alert message, such as to a user or administrator.

The messages which it is desired to scan for malware will typically be exchanged between different computers, although this need not necessarily be the case. The invention is particularly well suited to embodiments in which the message is one of an e-mail message, a remote procedure call or a remote procedure response.

Viewed from other aspects the present invention provides a method of scanning for malware within messages and an apparatus for scanning for malware within messages.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
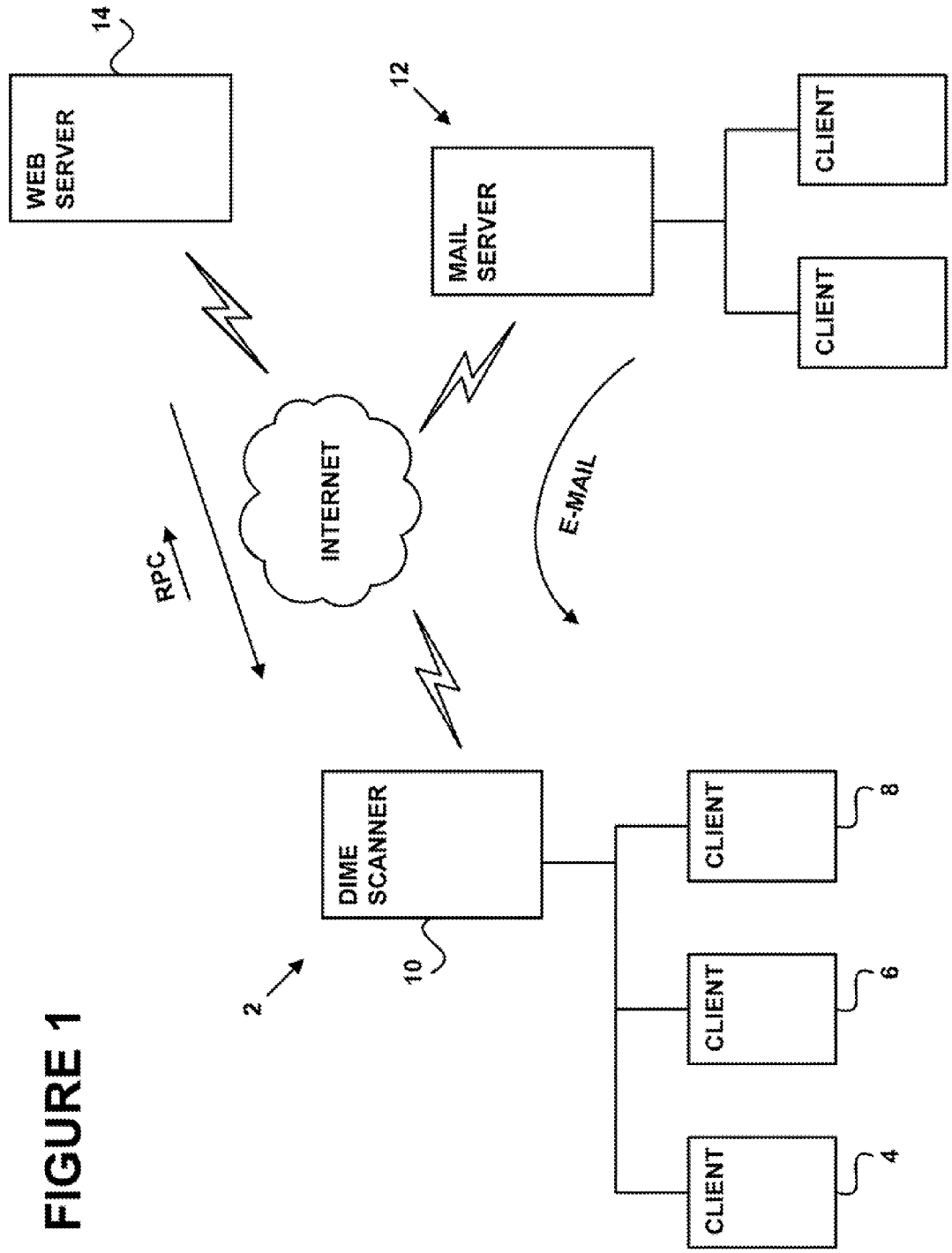
FIG. 1 schematically illustrates a computer network connected via the internet to a source of e-mail messages and a web server.

FIG. 1 schematically illustrates a local network 2 comprising a plurality of client computers 4, 6, 8 each connected to a DIME scanning computer 10 which serves to perform malware scanning upon any DIME messages received into the network 2. The DIME scanner 10 is connected to the internet. Via this internet connection, the DIME scanner 10 may receive e-mail messages from a remote network 12 and handle remote procedure call requests and responses to and from a web server 14. In one example an e-mail message originates within the network 12 from a client of that network and is passed via a mail server of that network through the internet to the DIME scanner 10 before being routed on to the particular addressed client computer within the network 2. The e-mail message uses the DIME message format and includes a text body and multiple attachments. An overall description of the DIME message format may be found in the document entitled "DIME: Sending Binary Data Within Your SOAP Messages" by Matt Powell of Microsoft Corporation dated 22 Jan. 2002 and published on the MSDN internet site. Various other descriptions of the DIME message format are publicly available.

The e-mail message may contain computer file attachments of a variety of different types. Some of these file types, such as image files, e.g. JPEGs, will not require malware scanning as they may be considered not capable of carrying malware. Other attached computer files may include executable files which should be scanned for malware and Word documents which should be scanned for malware, such as embedded macro viruses.

An alternative use of the DIME message format is also illustrated in FIG. 1. In this example a client computer within the network 2 issues a remote procedure call to the web server 14. This remote procedure call may include a computer file being passed from the client computer to the web server 14 and this computer file should be malware scanned as it is outbound through the DIME scanner 10. The web server 14 will then perform the requested remote processing upon the computer file concerned and return remote procedure result data including a different computer file to the originating client computer. As this DIME message including the remote procedure call response is returned inbound through the DIME server 10 it is again malware scanned.

Figure 2:
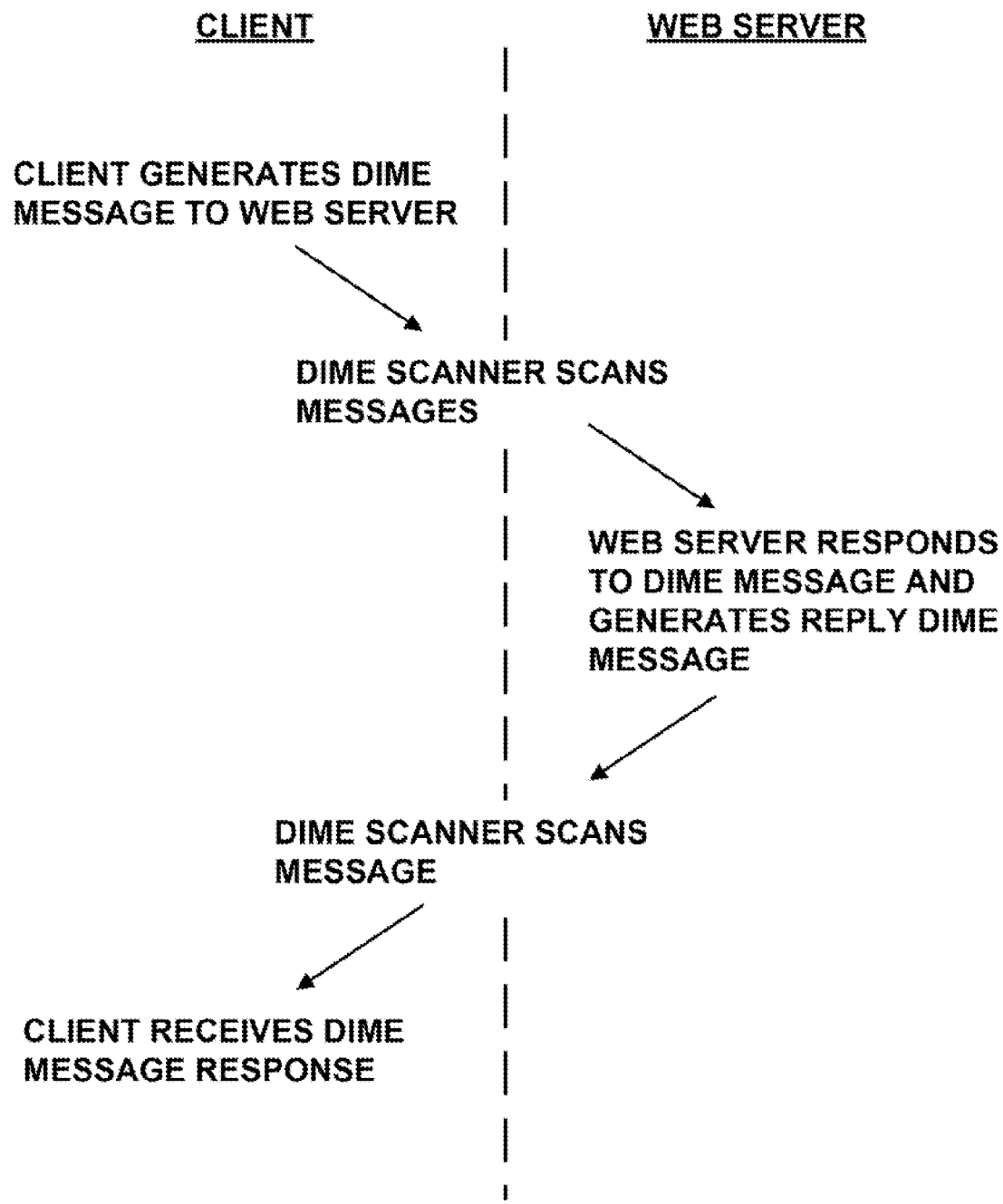
FIG. 2 schematically illustrates a remote procedure call and response using a message format.

FIG. 2 illustrates the remote procedure call and remote procedure response flow discussed above. Firstly, the client computer generates a DIME message carrying the remote procedure call request and passes this to the web server via the DIME scanner which scans the outbound DIME message. The web server responds to this DIME message and performs the requested remote processing before generating its reply DIME message to be returned to the client computer. This reply DIME message again passes through the DIME scanner where it is scanned for malware before being received at the initiating client computer.

Figure 3:
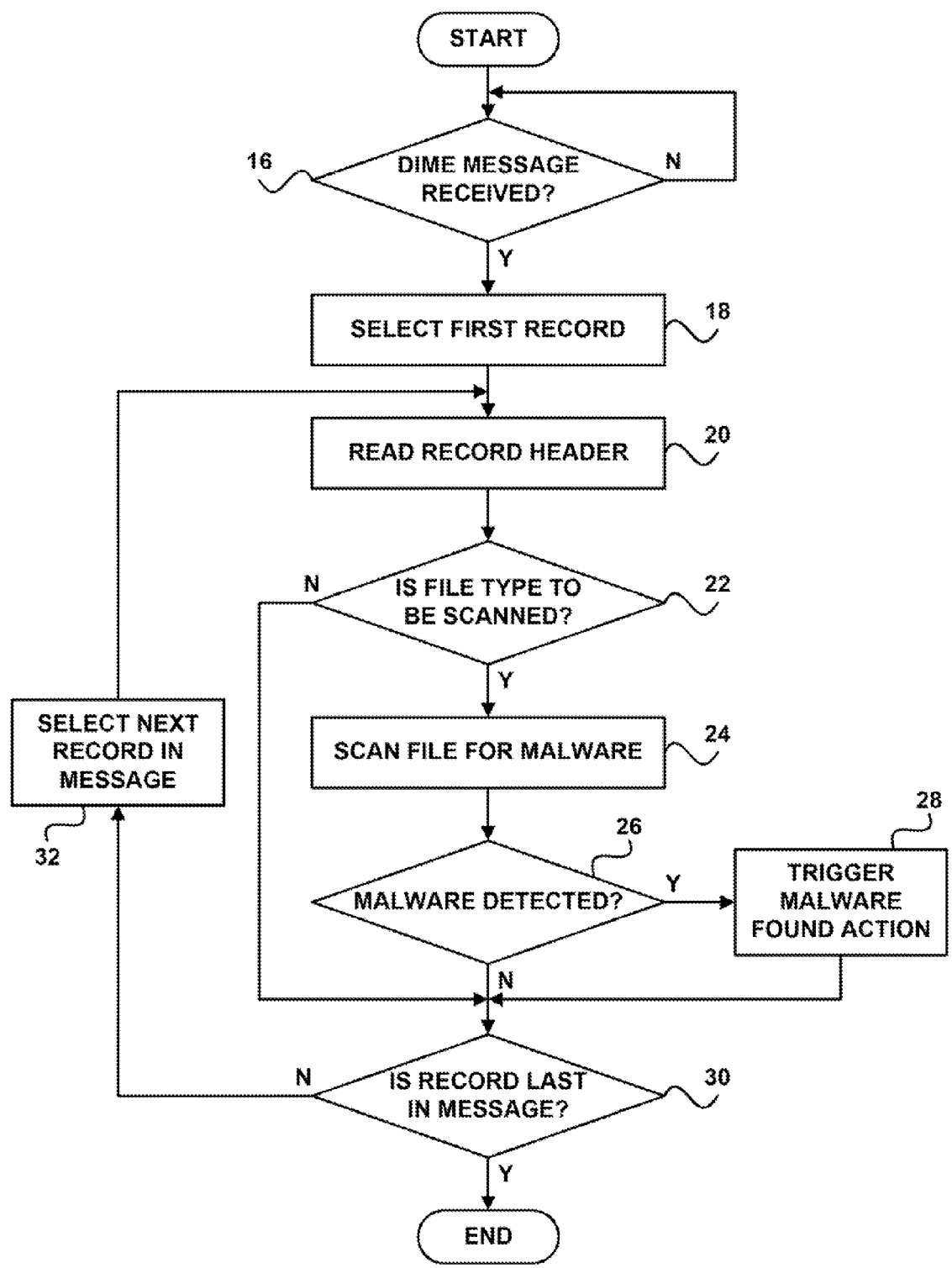
FIG. 3 is a flow diagram schematically illustrating message scanning.

FIG. 3 schematically illustrates a flow diagram showing the processing performed by the DIME scanner 10. At step 16 the DIME scanner 10 waits until a DIME message is received. In some embodiments the DIME scanner 10 may wait until the whole DIME message has been received before it initiates malware scanning upon that message. Alternatively, it may be possible to initiate the malware scanning before the DIME message has been fully received since the DIME message format allows the separate data records to be treated as individual entities which can be malware scanned in their own right as appropriate. Since the DIME message format allows very large messages to be exchanged, it is an advantage to be able to initiate malware scanning on these messages prior to all of the message being received as a way of reducing the latency associated with malware scanning.

Once a DIME message has been received (or at least the first data record within such a message), then step 18 selects the first record within the message. Step 20 then reads the record header information from the data record concerned. Step 22 determines from the file type information contained within the record header whether or not the data payload associated with that data record should be malware scanned. As an example, if the data type indicates that the data payload is text data, or image data, then these may not need malware scanning as they may be deemed not to be capable of containing malware. The particular configuration and decision as to whether or not individual file types should be malware scanned will vary depending upon the situation. As an example, if a malware scanner is trying to identify banned words, such as obscene or offensive words within e-mail messages, then text data may be malware scanned to identify whether or not it contains any such banned words even if it cannot carry a virus. Other data types, such as executable files or computer files that may contain macros are known to represent a significant risk of malware infection and will be scanned as appropriate. Those computer files (payload data) identified at step 22 as having a file type that should be scanned are passed to step 24 where the malware scanning for computer viruses, worms, Trojans, banned words, banned files, banned images etc. is performed in accordance with the user configuration and what is appropriate for the file type concerned. If malware is detected as determined at step 26, then a malware found action is triggered at step 28. The malware found action may include deleting the payload data, quarantining the payload data, disinfecting the payload data, repairing the payload data, generating an alert message, such as to a user or administrator, or a combination of the above or other actions. Following step 28, or subsequent to step 22, if the file type is not to be scanned, processing proceeds to step 30 at which a determination is made as to whether or not the last data record within the message has yet been reached. The DIME message format includes within each data record flags which indicate whether it is the first data record within that message, the last data record within that message, both or other attributes, such as being a data record that forms part (a chunk) of a computer file. These flags may be read at step 30. If the data record is the last data record in the message, then the process terminates (or returns to step 16 to await the next DIME message). If the test at step 30 indicates that the last data record has not yet been reached, then processing proceeds to step 32 at which the next data record is selected for consideration and processing returned to step 20.

Figure 4:
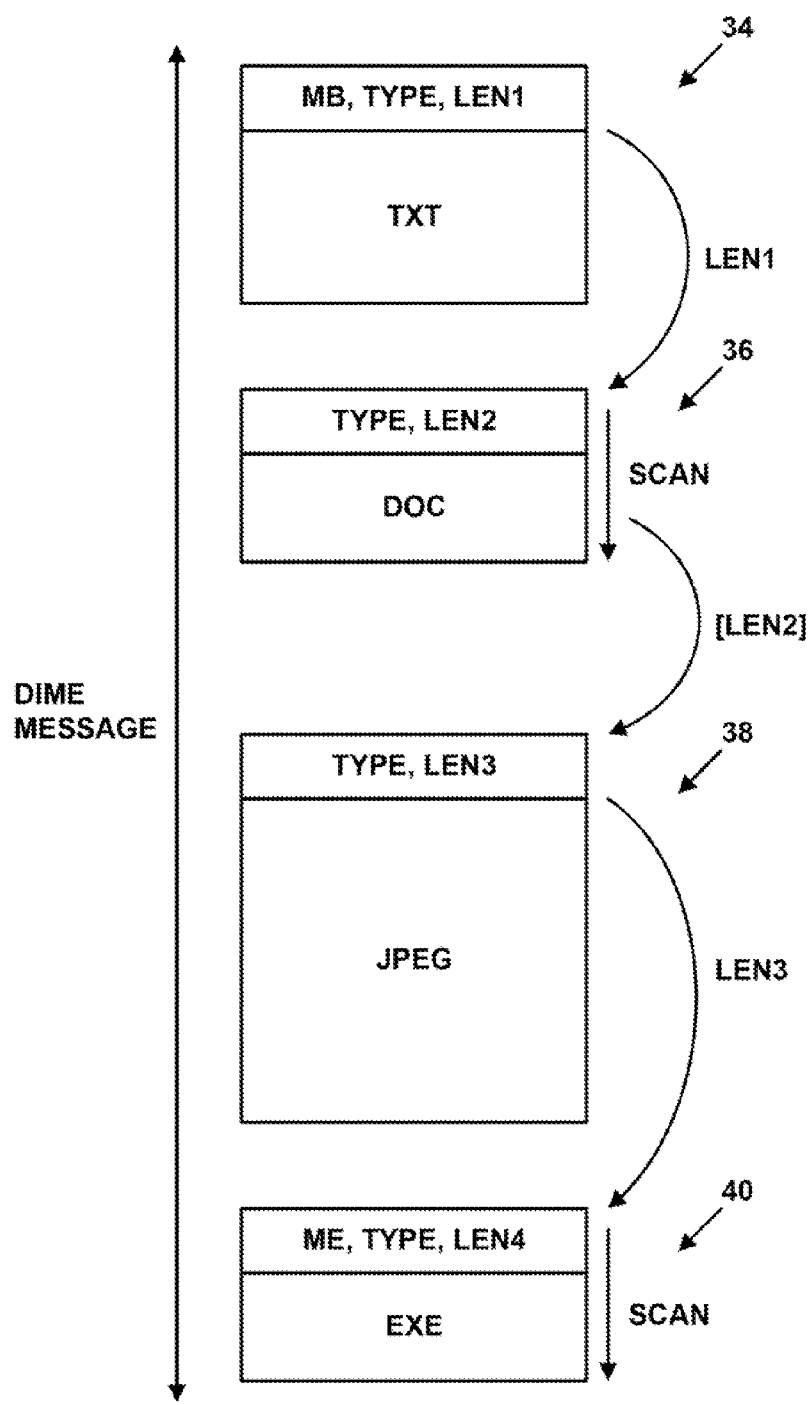
FIG. 4 is a diagram schematically illustrating the malware scanning of a message containing multiple data records.

FIG. 4 schematically illustrates a DIME message containing four data records. It will be seen that each data record contains a header including data identifying the type of computer file that forms the data payload associated with that data record and the length of that data record (this effectively forms a pointer to the start of the next data record or the end of the message). The first data record 34 is marked with a message begins flag and carries a data payload that is text data. In this example, text data is not to be malware scanned and so once the header has been read to identify that the payload data is text data, then the length data embedded in the header is used to make a jump within the DIME message to the start of the second data record 36. Starting at the beginning of the second data record 36, the header information is read which indicates that the data payload for that data record is a Word document. Word documents are selected to be scanned for macro viruses and accordingly scanning of the payload data is initiated. The scanning of the Word document may only need to determine whether or not the Word document contains a macro and if necessary analyse this macro. Once this determination has been made, the malware scan of the data record 36 may be terminated and a jump made using the length data embedded in the header to the start of the third data record 38. The type data of this third data record indicates that the payload data is a JPEG computer file. In this example JPEG computer files are not malware scanned and accordingly the length data is used to jump to the fourth data record 40.

The fourth data record 40 contains an executable file as its payload data and this is subject to malware scanning to determine whether it contains a computer virus or constitutes a worm or a Trojan. The fourth data record 40 also carries a flag in its header indicating that it is the end of the message and accordingly further malware scanning of the message is not required.

Figure 5:
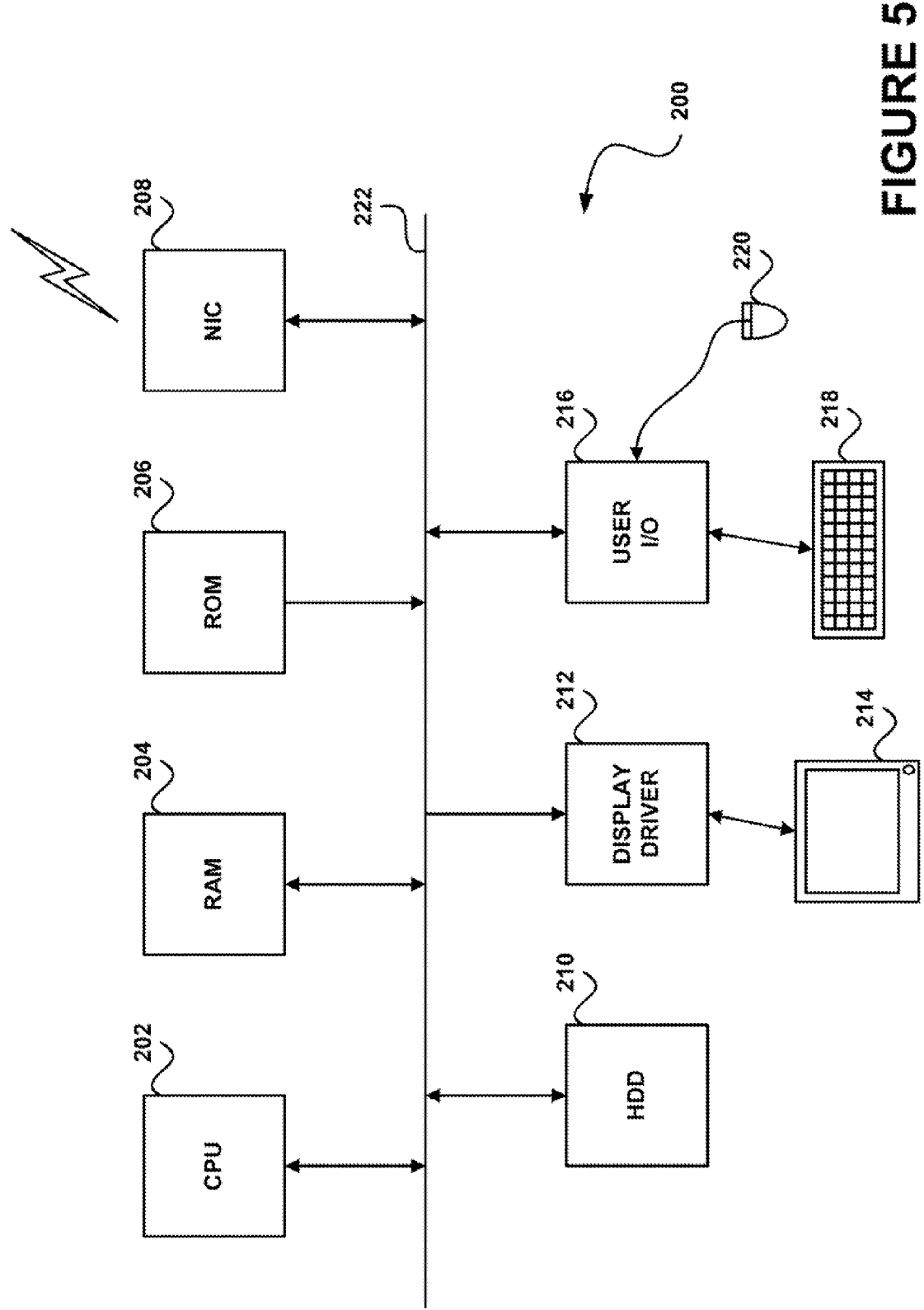
FIG. 5 is a diagram schematically illustrating the architecture of a general purpose computer of the type which may be used to implement the above described techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product embodied on a tangible computer readable medium for detecting malware, said computer program product comprising:
   receiving code operable to receive a message containing a plurality of data records, each data record having associated record, characterizing data and payload data, said record characterizing data including type data identifying data type of payload data of said data record and length dam identifying length of said data record;
   determining code operable to determine from type data of a data record whether or not payload data of said data record should be scanned for malware;
   scanning code operable if said type data indicates that said payload data should be scanned for malware to scan said payload data for malware; and
   calculating code operable if a last data record within said message has not yet been subject m said determination to calculate from said length dam a start location of a next data record within said message to be subject to said determination;
   wherein said scanning of said payload data includes directly scanning said payload data in an unencoded form and is initiated before an entirety of said message is received and after at least one of said plurality of data records is received in order to reduce a latency associated with said malware scanning.

2. A computer program product as claimed in claim 1, wherein said payload data is a computer file.

3. A computer program product as claimed in claim 2, wherein said computer file directly forms said payload data without encoding.

4. A computer program product as claimed in claim 1, wherein said message is a DIME message.

5. A computer program product as claimed in claim 1, wherein said message is one of:
   an e-mail message;
   a remote procedure call; and
   a remote procedure response.

6. A computer program product as claimed in claim 1, wherein said malware scanning scans for one or more of:
   a computer virus;
   a worm;
   a Trojan;
   a banned file;
   a banned word; and
   a banned image.

7. A computer program product as claimed in claim 1, wherein if malware is found within a data record, then a malware found action is triggered.

8. A computer program product as claimed in claim 7, wherein said malware found action is one or more of:
   deleting at least said payload data of said data record;
   quarantine at least said payload data of said data record;
   disinfecting at least said payload data of said data record;
   repairing at least said payload data of said data record; and
   generating an alert message.

9. A computer program product as claimed in claim 1, wherein a data record within said message comprises a further message.

10. A computer program product as claimed in claim 1, wherein a type of said malware scanning is performed according to a user configuration and said type data.

11. A method of detecting malware, said method comprising the steps of:
- receiving a message containing a plurality of data records, each data record having associated record characterizing data and payload data, said record characterizing data including type data identifying data type of payload data of said data record and length data identifying length of said data record;
- determining from type data of a data record whether or not payload data of said data record should be scanned for malware;
- if said type data indicates that said payload data should be scanned for malware, then scanning said payload data for malware; and
- if a last data record within said message has not yet been subject to said step of determining, then calculating from said length data a start location of a next data record within said message to be subject to said step of determining;
- wherein said scanning of said payload data includes directly scanning said payload data in an unencoded form and is initiated before an entirety of said message is received and after at least one of said plurality of data records is received in order to reduce a latency associated with said malware scanning.

12. A method as claimed in claim 11, wherein said payload data is a computer file.

13. A method as claimed in claim 12, wherein said computer file directly forms said payload data without encoding.

14. A method as claimed in claim 11, wherein said message is a DIME message.

15. A method as claimed in claim 11, wherein said message is one of:
- an e-mail message;
- a remote procedure call; and
- a remote procedure response.

16. A method as claimed in claim 11, wherein said malware scanning scans for one or more of:
- a computer virus;
- a worm;
- a Trojan;
- a banned file;
- a banned word; and
- a banned image.

17. A method as claimed in claim 11, wherein if malware is found within a data record, then a malware found action is triggered.

18. A method as claimed in claim 17, wherein said malware found action is one or more of:
- deleting at least said payload data of said data record;
- quarantine at least said payload data of said data record;
- disinfecting at least said payload data of said data record;
- repairing at least said payload data of said data record; and
- generating an alert message.

19. A method as claimed in claim 11, wherein a data record within said message comprises a further message.

20. A computer program product as claimed in claim 1, wherein said record characterizing data further includes data representing whether said associated data record is a portion of a data file.

21. Apparatus for detecting malware, said apparatus comprising:
- receiving logic operable to receive a message containing a plurality of data records, each data record having associated record characterizing data and payload data, said record characterizing data including type data identifying data type of payload data of said data record and length data identifying length of said data record;
- determining logic operable to determine from type data of a data record whether or not payload data of said data record should be scanned for malware;
- scanning logic operable if said type data indicates that said payload data should be scanned for malware to scan said payload data for malware; and
- calculating logic operable if a last data record within said message has not yet been subject to said determination to calculate from said length data a start location of a next data record within said message to be subject to said determination;
- wherein said scanning of said payload data includes directly scanning said payload data in an unencoded form and is initiated before an entirety of said message is received and after at least one of said plurality of data records is received in order to reduce a latency associated with said malware scanning.

22. Apparatus as claimed in claim 21, wherein said payload data is a computer file.

23. Apparatus as claimed in claim 22, wherein said computer file directly forms said payload data without encoding.

24. Apparatus as claimed in claim 21, wherein said message is a DIME message.

25. Apparatus as claimed in claim 21, wherein said message is one of:
- an e-mail message;
- a remote procedure call; and
- a remote procedure response.

26. Apparatus as claimed in claim 21, wherein said malware scanning scans for one or more of:
- a computer virus;
- a worm;
- a Trojan;
- a banned file;
- a banned word; and
- a banned image.

27. Apparatus as claimed in claim 21, wherein if malware is found within a data record, then a malware found action is triggered.

28. Apparatus as claimed in claim 27, wherein said malware found action is one or more of:
- deleting at least said payload data of said data record;
- quarantine at least said payload data of said data record;
- disinfecting at least said payload data of said data record;
- repairing at least said payload data of said data record; and
- generating an alert message.

29. Apparatus as claimed in claim 21, wherein a data record within said message comprises a further message.

30. A computer program product as claimed in claim 1, wherein said payload data with said type data indicative of image data and text data does not require malware scanning and said payload data with said type data indicative of executable data.

* * * * *

UNITED STATES PATENT AND TRADEMARK OFFICE
CERTIFICATE OF CORRECTION

PATENT NO. : 7,376,842 B1
APPLICATION NO. : 10/096430
DATED : May 20, 2008
INVENTOR(S) : Hursey Page 1 of 1

It is certified that error appears in the above-identified patent and that said Letters Patent is hereby corrected as shown below:

Col. 6, line 13, replace "record," with -- record --;
Col. 6, line 16, replace "dam" with -- data --;
Col. 6, line 24, replace "m" with -- to --;
Col. 6, line 25, replace "dam" with -- data --.

Signed and Sealed this

Fifth Day of October, 2010

David J. Kappos
*Director of the United States Patent and Trademark Office*